(12) United States Patent
Kuo et al.

(10) Patent No.: US 9,152,541 B1
(45) Date of Patent: Oct. 6, 2015

(54) AUTOMATED MOBILE APPLICATION VERIFICATION

(75) Inventors: Calvin Y. Kuo, Irvine, CA (US); Zahur A. Peracha, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 455 days.

(21) Appl. No.: 13/427,128

(22) Filed: Mar. 22, 2012

(51) Int. Cl.
*G06F 9/44* (2006.01)
*G06F 11/36* (2006.01)

(52) U.S. Cl.
CPC ........ *G06F 11/3672* (2013.01); *G06F 11/3692* (2013.01)

(58) Field of Classification Search
CPC ............ G06F 11/3672; G06F 11/3688; G06F 11/3692; G06F 11/3676; G06F 2201/865; G06F 8/77
See application file for complete search history.

(56) References Cited

U.S. PATENT DOCUMENTS

| | | | |
|---|---|---|---|
| 7,490,319 B2 * | 2/2009 | Blackwell et al. | 717/124 |
| 7,813,910 B1 * | 10/2010 | Poulin | 703/22 |
| 8,019,588 B1 * | 9/2011 | Wohlberg et al. | 717/134 |
| 2003/0200530 A1 * | 10/2003 | Sayag | 717/114 |
| 2006/0156288 A1 * | 7/2006 | Jones et al. | 717/124 |
| 2007/0234293 A1 * | 10/2007 | Noller et al. | 717/124 |
| 2009/0007074 A1 * | 1/2009 | Campion et al. | 717/124 |
| 2009/0138856 A1 * | 5/2009 | Oja et al. | 717/126 |
| 2010/0095234 A1 * | 4/2010 | Lane et al. | 715/773 |
| 2011/0055773 A1 * | 3/2011 | Agarawala et al. | 715/863 |
| 2011/0161484 A1 * | 6/2011 | Van den Bogaert et al. | 709/224 |
| 2013/0074046 A1 * | 3/2013 | Sharma et al. | 717/126 |
| 2013/0078949 A1 * | 3/2013 | Pecen et al. | 455/411 |
| 2013/0137498 A1 * | 5/2013 | Willyard | 463/16 |

OTHER PUBLICATIONS

James A. Rowson; Hardware Software Co-Simulation; 1994 ACM; pp. 439-440; <http://ieeexplore.ieee.org/stamp/stamp.jsp?tp=&arnumber=1600416>.*
Hong Zhu et al.; Software unit test coverage and adequacy; 1997 ACM; pp. 366-427; <ttp://dl.acm.org/citation.cfm?id=267590>.*
Todd Austin et al.; SimpleScalar an Infrastructure for Computer System Modeling; 2002 IEEE: pp. 59-67; <http://ieeexplore.ieee.org/stamp/stamp.jsp?tp=&arnumber=982917>.*
Sandra Rapps et al.; Selecting Software Test Data Using Data Flow Information ; 1985 IEEE; pp. 367-375; <http://ieeexplore.ieee.org/stamp/stamp.jsp?tp=&arnumber=1702019>.*
Bogdan Korel; Automated Software Test Data Generation; 1990 IEEE; pp. 870-879; <http://ieeexplore.ieee.org/stamp/stamp.jsp?tp=&arnumber=57624>.*
Robert G. Sargent; Verification and Validation of Simulation Models; 2005 ACM; pp. 130-143; <http://dl.acm.org/citation.cfm?id=1162736>.*

* cited by examiner

*Primary Examiner* — Thuy Dao
*Assistant Examiner* — Cuong V Luu
(74) *Attorney, Agent, or Firm* — Thomas | Horstemeyer, LLP

(57) ABSTRACT

Disclosed are various embodiments for automatically testing and verifying mobile applications. A mobile application is obtained from a source entity. The mobile application is automatically installed in different mobile computing devices in a testing environment. Execution of the mobile application is automatically initiated in the different mobile computing devices. Whether the mobile application meets performance criteria is automatically verified for each of the different mobile computing devices.

26 Claims, 5 Drawing Sheets

AUTOMATED MOBILE APPLICATION VERIFICATION

BACKGROUND

Applications often suffer from defects. Developers may put their applications through a quality assurance process in order to discover and correct defects before the applications are released to the public. Application defects may result from errors in the application code itself, from incompatibilities with the device on which it is executing, and/or from other sources.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to automated mobile application verification. It can be extremely difficult for an application developer to test an application on all platforms or devices on which the application is going to be executed. Mobile devices, in particular, suffer from an unwieldy proliferation of different devices and platforms. As technology rapidly advances, new versions of mobile devices are released in a matter of months. Consequently, it can be difficult for application developers to acquire the mobile devices needed for exhaustive device compatibility testing or to conduct such testing in a scalable manner. Further, application marketplaces may wish to conduct some form of quality assurance testing on third-party applications before offering the applications for download. The quantity of applications and devices on which they are to be tested may make manual testing infeasible.

Various embodiments of the present disclosure facilitate automated verification of mobile applications. A multitude of different mobile devices may be available in a networked environment that is configured for automated testing. An application may be deployed to the mobile devices and executed. Various input data may be automatically supplied to the mobile devices, with the state of the executing applications being monitored. For example, the applications may be monitored for crashes, unresponsiveness, resource consumption, activity progress, and so on.

In one embodiment, an application marketplace may employ such a testing environment to verify whether a third-party application meets various performance criteria. In another embodiment, such a testing environment may be made available to third-party developers as a service, which may be used for internal quality assurance evaluations. Although the present disclosure refers to mobile applications and mobile computing devices, it is understood that the concepts of the present disclosure may be employed for applications executable in computing devices which are not "mobile" computing devices. In the following discussion, a general description of the system and its components is provided, followed by a discussion of the operation of the same.

Figure 1:
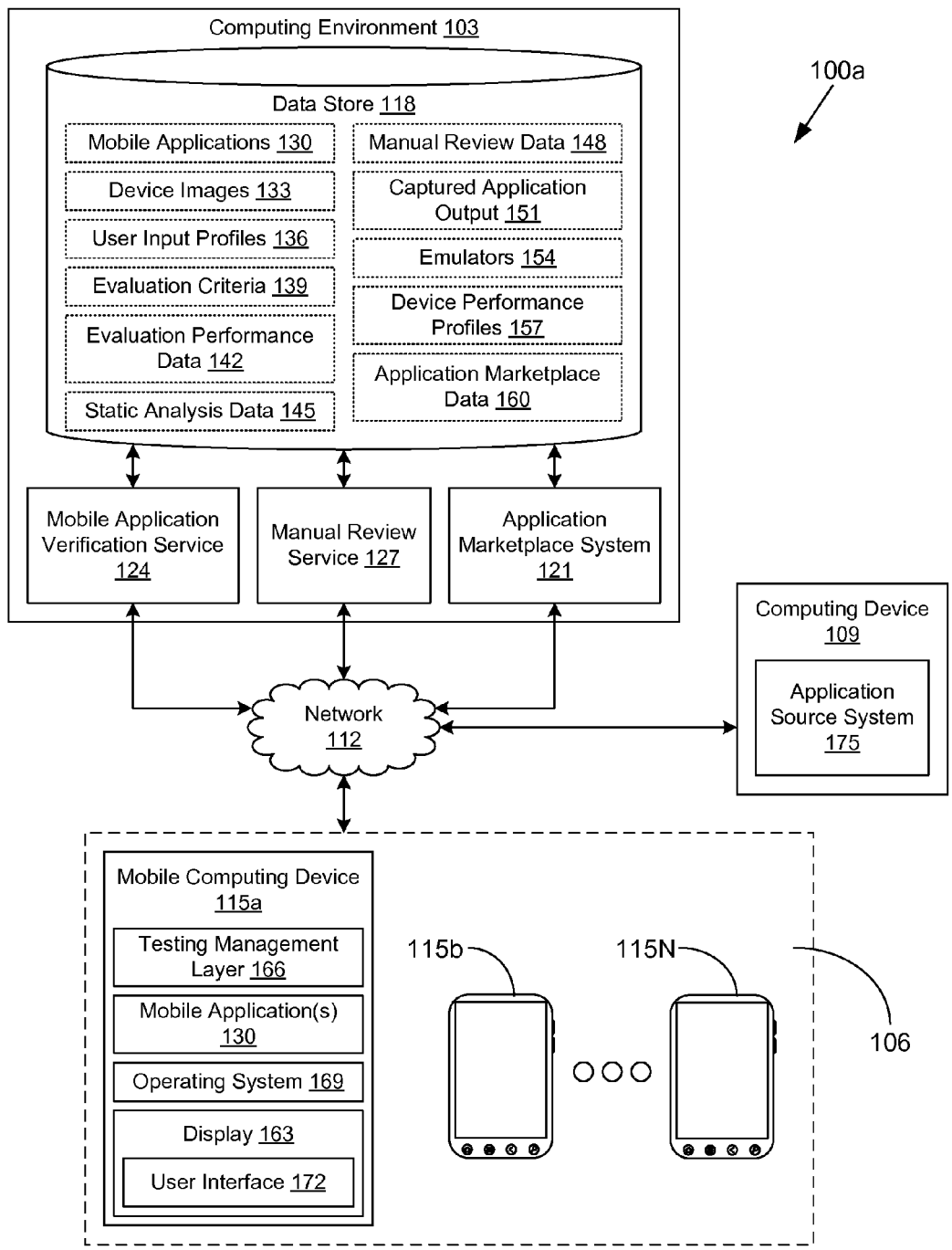
FIGS. 1 and 2 are drawings of a networked environment according to various embodiments of the present disclosure.

With reference to FIG. 1, shown is a networked environment 100a according to various embodiments. The networked environment 100a includes a computing environment 103 in data communication with a testing environment 106 and one or more computing devices 109 by way of a network 112. The testing environment 106 includes a plurality of mobile computing devices 115a, 115b ... 115N. The network 112 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a computing device such as a server computer or any other system providing computing capability. Alternatively, a plurality of computing devices may be employed that are arranged, for example, in one or more server banks or computer banks or other arrangements. For example, a computing environment 103 may comprise a cloud computing resource, a grid computing resource, and/or any other distributed computing arrangement. The computing environment 103 may include computing devices that may be located in a single installation or may be distributed among many different geographical locations.

Various applications and/or other functionality may be executed in the computing environment 103 according to various embodiments. Also, various data is stored in a data store 118 that is accessible to the computing environment 103. The data store 118 may be representative of a plurality of data stores 118 as can be appreciated. The data stored in the data store 118, for example, is associated with the operation of the various applications and/or functional entities described below.

The components executed on the computing environment 103, for example, include an application marketplace system 121, a mobile application verification service 124, a manual review service 127, and other applications, services, processes, systems, engines, or functionality not discussed in detail herein. The application marketplace system 121 is executed to provide an online presence for the distribution of applications for use on mobile devices such as, for example, smartphones, electronic book readers, tablet computers, personal digital assistants, etc. Such an online presence may be referred to as an "application marketplace." The application marketplace system 121 may be operated by a proprietor who may enable distribution access by various third-party developers. The third-party developers may upload their mobile applications to the application marketplace system 121. The mobile applications may be added to the application marketplace and distributed to end users by the application marketplace system 121 provided that the mobile applications meet certain criteria, e.g., performance criteria, including stability criteria, compatibility criteria, security criteria, behavior criteria, correctness criteria, etc.

The mobile application verification service 124 is executed to obtain mobile applications and perform various performance testing and verification procedures on them by way of an automated testing environment 106. To this end, the mobile application verification service 124 is configured to automatically deploy and install the mobile applications to various different mobile computing devices 115 in the testing environment 106. The mobile application verification service 124 causes the mobile applications to be executed in each of the different mobile computing devices 115 and provides simulated user input to each executing instance. The performance of each of the instances is recorded. The performance may be provided to the developers or sources of the mobile applications. In one embodiment, the performance may be employed as a verification check which may enable, disable, or further configure a listing for a mobile application in the application marketplace.

The manual review service 127 may be executed to obtain a manual review of information to facilitate the automated verification by the mobile application verification service 124. In one example, the manual review service 127 may be employed for purposes of configuring simulated user input to be provided to the mobile applications executed under the auspices of the mobile application verification service 124. In one embodiment, the manual review service 127 submits video, audio, images, or other output captured from the mobile application instances for manual review by independent contractors who may be compensated on a per-task basis. As a non-limiting example, a screen capture from a mobile application instance may be provided to an independent contractor or other user to determine what type of user input may be appropriate or permissible for the mobile application instance at the particular state represented in the screen capture, e.g., textual input of a certain type, a set of permissible input gestures, and so on.

The data stored in the data store 118 includes, for example, mobile applications 130, device images 133, user input profiles 136, evaluation criteria 139, evaluation performance data 142, static analysis data 145, manual review data 148, captured application output 151, emulators 154, device performance profiles 157, application marketplace data 160, and potentially other data. The mobile applications 130 correspond to applications, including executable code and data, which may be offered in an application marketplace or may be otherwise submitted by third parties for verification or performance evaluation. In some cases, the execution of a mobile application 130 may be modeled as a sequence of activities or phases that involve the user. In one embodiment, the mobile applications 130 may be specially instrumented to facilitate collection of performance data.

The mobile applications 130 may be supported by one or more different mobile computing platforms. In one non-limiting example, at least some of the mobile applications 130 may be executable on the ANDROID platform and may correspond to the ANDROID package (APK) file format. In another non-limiting example, at least some of the mobile applications 130 may be executable on the IPHONE platform and may correspond to the IPHONE package archive (IPA) file format.

The device images 133 may correspond to predetermined configurations for the mobile computing devices 115 to which the mobile computing devices 115 are to be initialized before and after installation of a mobile application 130 for testing purposes. In other words, the device images 133 may be employed to "reset" or "reflash" the respective mobile computing devices 115. In one embodiment, the corresponding device image 133 may be stored in each mobile computing device 115 for fast access. In another embodiment, the corresponding device image 133 may be loaded on-demand to the mobile computing device 115 from the data store 118 by way of the network 112.

The user input profiles 136 include data used to generate simulated user input to be provided to the executing instances of the mobile applications 130. The simulated user input may include textual input, touchscreen gesture input, audio input, image input, and/or other forms of user input. The user input profiles 136 may be generated based at least in part on a static analysis of a mobile application 130, a manual confirmation of user inputs obtained by way of the manual review service 127, a randomized approach, and/or other approaches. The user input profiles 136 may be the same for a particular mobile application 130 across multiple different mobile computing devices 115 or may differ across multiple different mobile computing devices 115.

The evaluation criteria 139 include various criteria and thresholds about which the performance of each of the instances of the mobile applications 130 is to be evaluated or verified. The evaluation criteria 139 may include absolute criteria to be applied across mobile applications 130 and/or relative criteria to evaluate the performance of a single mobile application 130 across different mobile computing devices 115. In various examples, the evaluation criteria 139 may pertain to the responsiveness of the mobile application 130, the resources consumed by the mobile application 130 (e.g., processor time, memory consumption, network bandwidth consumption, and so on), whether the mobile application 130 is permitted to access certain protected or secured resources, whether the mobile application 130 has crashed, an expected progress in the mobile application 130 measured by time, activities, and/or other metrics, and/or other criteria. The evaluation criteria 139 may, for example, include progress criteria, stability criteria, security criteria, and/or other criteria.

The evaluation performance data 142 includes various data relating to the observed performance of the mobile applications 130. The evaluation performance data 142 may be assessed against the evaluation criteria 139. To this end, the evaluation performance data 142 may record information related to the responsiveness of the mobile application 130, activities reached by the mobile application 130, time spent at one or more of the activities, computing resources consumed at various times, resources accessed, and so on.

The static analysis data 145 may record the results of a static analysis performed on a mobile application 130 by the mobile application verification service 124. The static analysis data 145 may indicate the types of user input that are elicited by the mobile application 130 at various times or stages of execution. For example, the static analysis data 145 may indicate that a particular mobile application 130 initially presents a screen of two buttons, selection of one button leads to a first activity, and selection of another button leads to a second activity. Further analysis may indicate that the first activity expects the user to fill in textual input in two text regions, while the second activity expects the user to supply a swipe gesture. The static analysis data 145 may also indicate what data the mobile application 130 expects to obtain, e.g., from a configuration file or other source.

The manual review data 148 indicates the results of manual reviews of mobile application 130 output. It may be desired that the user inputs identified by the static analysis be verified by a human user. Alternatively, the static analysis may be unable to identify a particular user input field, or the specific type of the user input. To this end, the manual review service 127 may present a screen capture, video, audio, etc. captured from the mobile application 130 to a human user to verify the type of user input elicited at certain point or activity in the mobile application 130. The manual review data 148 stores the product of this manual review. In some cases, the same output from a mobile application 130 may be presented for manual review to multiple human users for quality assurance and/or other purposes.

The captured application output 151 may store the captured video, images, audio, etc. from the mobile application 130. The captured application output 151 may be used for manual review, automatic analysis and identification of the user input solicited by the mobile application 130 at a given state, automatic identification of the current state of the mobile application 130, and/or for other purposes.

The emulators 154 correspond to software that enables emulation or virtualization of a particular mobile computing device 115. The emulators 154 may emulate the various hardware resources, the performance characteristics, and/or other characteristics of a mobile computing device 115. In some cases, the emulators 154 may use the device performance profiles 157 to facilitate emulation. The device performance profiles 157 include data indicating the performance characteristics of particular mobile computing devices 115, e.g., processor performance, memory performance, touchscreen performance, etc. The device performance profiles 157 may be in a format suitable to configure operation of the emulators 154.

The application marketplace data 160 includes various data relating to the operation of the application marketplace system 121. The application marketplace data 160 may describe the various mobile applications 130 which are offered for download, pricing for the mobile applications 130, information about which mobile applications 130 are compatible with which mobile computing devices 115, metadata for the mobile applications 130, and/or other information.

The testing environment 106 may include a networked array of physical mobile computing devices 115 which are maintained for the purposes of automated testing and verification of mobile applications 130. The mobile computing devices 115 may correspond to different device platforms (e.g., BLACKBERRY, IPHONE, ANDROID, etc.) and different models of devices from a variety of manufacturers. Although a particular mobile application 130 may be tested on multiple different mobile computing devices 115, the testing environment 106 may include multiple units of the same mobile computing device 115 to support concurrent testing of multiple mobile applications 130.

Each mobile computing device 115 may comprise, for example, a processor-based system such as a computer system. Such a computer system may be embodied in the form of a laptop computer, personal digital assistants, cellular telephones, smartphones, music players, web pads, tablet computer systems, game devices, electronic book readers, or other devices with like capability. Each mobile computing device 115 may include a display 163. The display 163 may comprise, for example, one or more devices such as liquid crystal display (LCD) screens, gas plasma-based flat panel displays, organic light emitting diode (OLED) displays, electronic ink displays, or other types of display devices, etc.

Each mobile computing device 115 may be configured to execute various systems such as a testing management layer 166, one or more mobile applications 130, an operating system 169, and/or other systems. The testing management layer 166 is executed to facilitate management of the particular mobile computing device 115 for the mobile application verification service 124. To this end, the testing management layer 166 may be configured to enable initialization or reset of the mobile computing device 115, installation of mobile applications 130, performance monitoring, and/or other features related to management of testing. In one embodiment, the testing management layer 166 may incorporate the commercially available ANDROID Monkey application. The mobile applications 130 correspond to the particular subset of the mobile applications 130 from the data store 118 which are loaded onto the mobile computing device 115 for testing. The mobile applications 130 may be configured to render a user interface 172 on the display 163.

The computing device 109 may comprise, for example, a server computer or any other system providing computing capability. Alternatively, a plurality of computing devices 109 may be employed that are arranged, for example, in one or more server banks or computer banks or other arrangements. For example, a plurality of computing devices 109 together may comprise a cloud computing resource, a grid computing resource, and/or any other distributed computing arrangement. Such computing devices 109 may be located in a single installation or may be distributed among many different geographical locations. For purposes of convenience, the computing device 109 is referred to herein in the singular. Even though the computing device 109 is referred to in the singular, it is understood that a plurality of computing devices 109 may be employed in the various arrangements as described above.

Various applications and/or other functionality may be executed in the computing device 109 according to various embodiments. The components executed on the computing device 109, for example, include an application source system 175, and other applications, services, processes, systems, engines, or functionality not discussed in detail herein. The application source system 175 is executed to transfer one or more mobile applications 130 from a source entity (e.g., a developer, publisher, and so on) to the computing environment 103 for testing and/or verification by the mobile application verification service 124. In embodiments including an application marketplace, the application source system 175 may request that a mobile application 130 be included in the application marketplace.

Next, a general description of the operation of the various components of the networked environment 100a is provided. To begin, a developer, publisher, or other source entity employs the application source system 175 to transfer a mobile application 130 to the computing environment 103 for testing and/or verification for inclusion in the application marketplace. Alternatively, the source entity may provide the mobile application 130 for testing for internal quality assurance purposes.

The mobile application verification service 124 initializes the testing environment 106 by automatically initializing a system state of each one of the mobile computing devices 115 to be used for testing. In one embodiment, the mobile application verification service 124 then automatically transfers and deploys the mobile application 130 to several different mobile computing devices 115 for testing. In another embodiment, the mobile application verification service 124 configures the mobile computing devices 115 to obtain the mobile application 130 from the application source system 175. The mobile application 130 may be deployed to all of the different models and platforms of mobile computing devices 115 or a selected subset of the mobile computing devices 115 as desired. In one example, the selected subset may correspond to a most popular set of mobile computing devices 115 in the application marketplace.

Using the testing management layer 166, the mobile application verification service 124 initiates the instances of the mobile application 130, provides simulated user input to the instances, and monitors the performance of the instances. In one embodiment, the simulated user input may merely be randomized user input. For example, the simulated user input may include randomized button presses, text entries, swipe gestures, multi-touch gestures, and so on. In other embodiments, the simulated user input may be generated based at least in part on static analysis data 145, manual review data 148, automated analysis and recognition from screen capture data, a manifest from the source entity which describes the user input, and/or other data. The simulated user input may be generated in advance and stored, or on demand for all instances or for each instance of the mobile application 130.

In monitoring the performance, the mobile application verification service 124 may assess the length of time that the mobile application 130 stays at a particular activity, the resources consumed, lifecycle events associated with state changes in the mobile application 130, data accessed or loaded by the mobile application 130 (e.g., configuration files, etc.), and/or other information. The mobile application 130 may be instrumented to collect performance information. Also, the testing management layer 166 may interact with the operating system 169 by way of an application programming interface (API) to collect performance information. In one embodiment, the operating system 169 may have an activity manager which manages the activities in the mobile computing device 115. The testing management layer 166 may register with the activity manager to receive notifications of state changes related to the execution of the mobile application 130, e.g., whether the mobile application 130 has become unresponsive, has crashed, etc.

The performance information for each of the instances may be compared with one another to determine whether the mobile application 130 performs poorly on some mobile computing devices 115 versus others. This comparison may be used to identify potential incompatibilities. The overall performance across the instances may be evaluated as well. The performance may be evaluated by the evaluation criteria 139 to determine whether the mobile application 130 may be included in the application marketplace and/or various parameters relating to offering the mobile application 130 in the application marketplace (e.g., supported devices, categories, recommendations, pricing, etc.). Also, the performance and/or verification results may be reported to the source entity or other entities by way of network pages, emails, and/or other forms of communication. For example, it may be reported to the developer or to customers of an application marketplace regarding on which devices the testing of the mobile application 130 failed.

Figure 2:
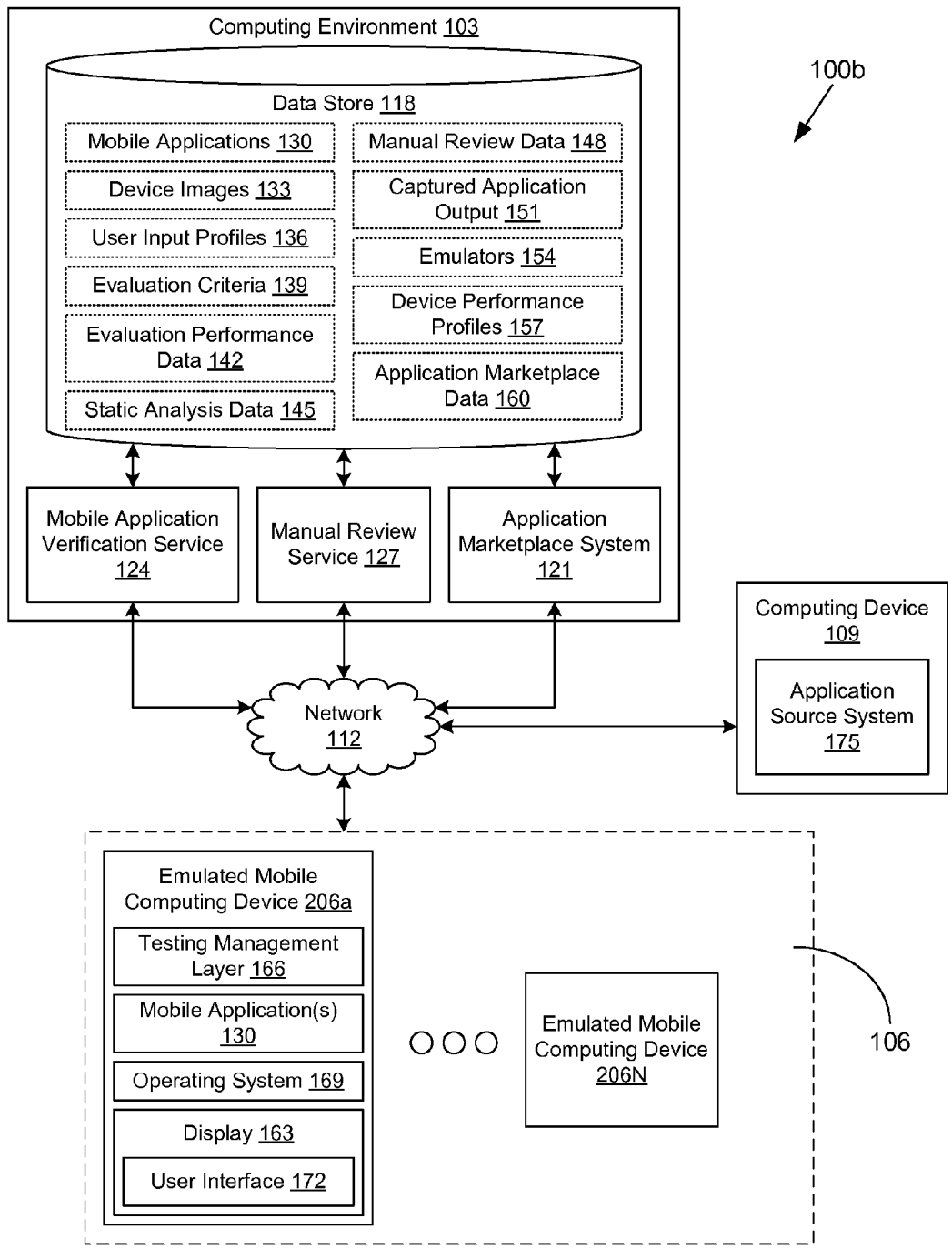

Turning now to FIG. 2, shown is another example of a networked environment 100b according to various embodiments. In the networked environment 100b, the testing environment 106 includes a plurality of emulated mobile computing devices 206a . . . 206N. Similarly to the mobile computing devices 115, each of the emulated mobile computing devices 206 includes a testing management layer 166, one or more mobile applications 130, an operating system 169, and a display 163, which may correspond to a virtualized display and on which a user interface 172 may be rendered. Each of the emulated mobile computing devices 206 may correspond to an emulator 154 executed in a computing device, for example, within the computing environment 103. In some cases, multiple emulators 154 may be executed in a single computing device.

The mobile application verification service 124 may function similarly in FIG. 2 as in FIG. 1. In some embodiments, the testing environment 106 may incorporate both emulated mobile computing devices 206 and actual mobile computing devices 115.

Figure 3:
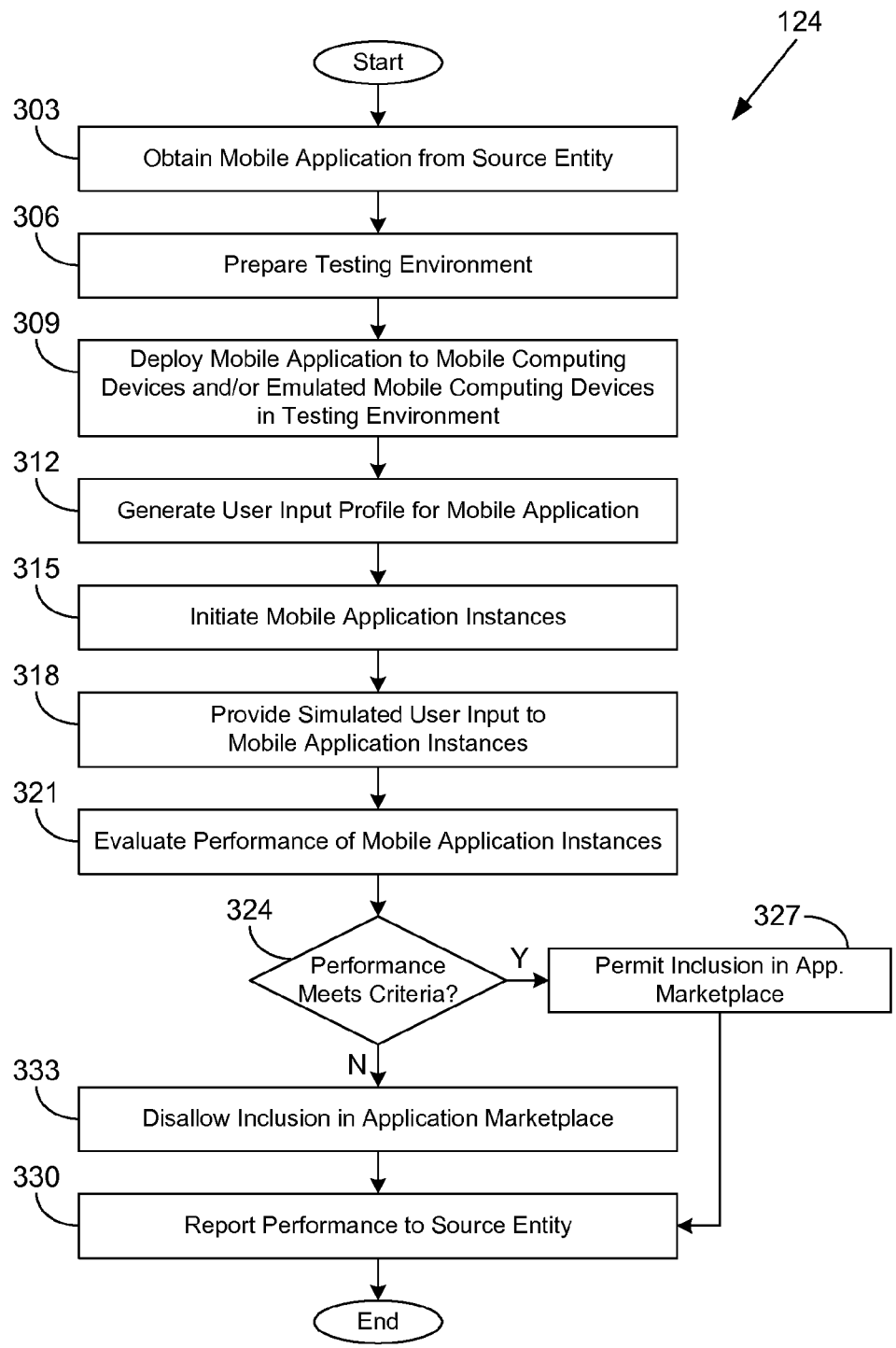
FIGS. 3 and 4 are flowcharts illustrating examples of functionality implemented as portions of a mobile application verification service executed in a computing environment in the networked environment of FIG. 1 according to various embodiments of the present disclosure.

Referring next to FIG. 3, shown is a flowchart that provides one example of the operation of a portion of the mobile application verification service 124 according to various embodiments. It is understood that the flowchart of FIG. 3 provides merely an example of the many different types of functional arrangements that may be employed to implement the operation of the portion of the mobile application verification service 124 as described herein. As an alternative, the flowchart of FIG. 3 may be viewed as depicting an example of steps of a method implemented in the computing environment 103 (FIG. 1) according to one or more embodiments.

Beginning with box 303, the mobile application verification service 124 obtains a mobile application 130 (FIG. 1) from a source entity. For example, a developer may upload the mobile application 130 to the application marketplace system 121 (FIG. 1) or the mobile application verification service 124 from the application source system 175 (FIG. 1). Alternatively, the mobile application verification service 124 may configure the mobile computing devices 115 (FIG. 1) to obtain the mobile application 130 from the application source system 175. In box 306, the mobile application verification service 124 prepares the testing environment 106 (FIG. 1). In some cases, the mobile application verification service 124 may reinitialize the mobile computing devices 115 in the testing environment 106 using the corresponding device images 133 (FIG. 1). Alternatively, the mobile application verification service 124 may simply uninstall previously tested mobile applications 130 from the mobile computing devices 115.

In box 309, the mobile application verification service 124 deploys the mobile application 130 to different mobile computing devices 115 and/or different emulated mobile computing devices 206 (FIG. 2) in the testing environment 106. To this end, the mobile application verification service 124 may transmit the mobile application 130 to the mobile computing devices 115 and/or emulated mobile computing devices 206 and install the mobile application 130 on the respective devices. In box 312, the mobile application verification service 124 generates a user input profile 136 (FIG. 1) for the mobile application 130. To this end, the mobile application verification service 124 may perform a static analysis on the mobile application 130 and/or perform manual review of the mobile application 130 by way of the manual review service 127 (FIG. 1). The generation of the user input profile 136 will be further discussed with reference to the flowchart of FIG. 4.

In box 315, the mobile application verification service 124 initiates execution of the installed instances of the mobile application 130 in the testing environment 106. In box 318, the mobile application verification service 124 provides simulated user input, generated according to the user input profile 136, to the executing instances of the mobile application 130 in the testing environment 106. In box 321, the mobile application verification service 124 evaluates the performance of the executing instances of the mobile application 130. The mobile application verification service 124 may measure resources consumed, determine time spent at particular activities, determine whether the instance of the mobile application 130 has prematurely exited or has become unresponsive, and so on. The mobile application verification service 124 may record the observed performance in the evaluation performance data 142 (FIG. 1).

In box 324, the mobile application verification service 124 determines whether the performance of the mobile application 130 meets the evaluation criteria 139 (FIG. 1). If the performance of the mobile application 130 meets the criteria, the mobile application verification service 124 permits inclusion of the mobile application 130 in the application marketplace. In some cases, the evaluation criteria 139 may be evaluated across all of the instances for an aggregate determination of acceptability for the application marketplace. In other cases, the evaluation criteria 139 may be evaluated for each instance such that particular mobile computing devices 115 may be indicated as supported or unsupported in the application marketplace. The mobile application verification service 124 continues to box 330.

If the performance of the mobile application 130 does not meet the criteria, the mobile application verification service 124 instead moves from box 324 to box 333. In box 333, the mobile application verification service 124 disallows inclusion of the mobile application 130 in the application marketplace. In some cases, the mobile application verification service 124 may allow the mobile application 130 to be generally included but with specific models or platforms of mobile computing devices 115 indicated as unsupported. The mobile application verification service 124 moves to box 330.

In box 330, the mobile application verification service 124 reports the observed performance and/or the evaluation results to the source entity associated with the mobile application 130, customers of the application marketplace, and/or other entities. Thereafter, the portion of the mobile application verification service 124 ends.

Figure 4:
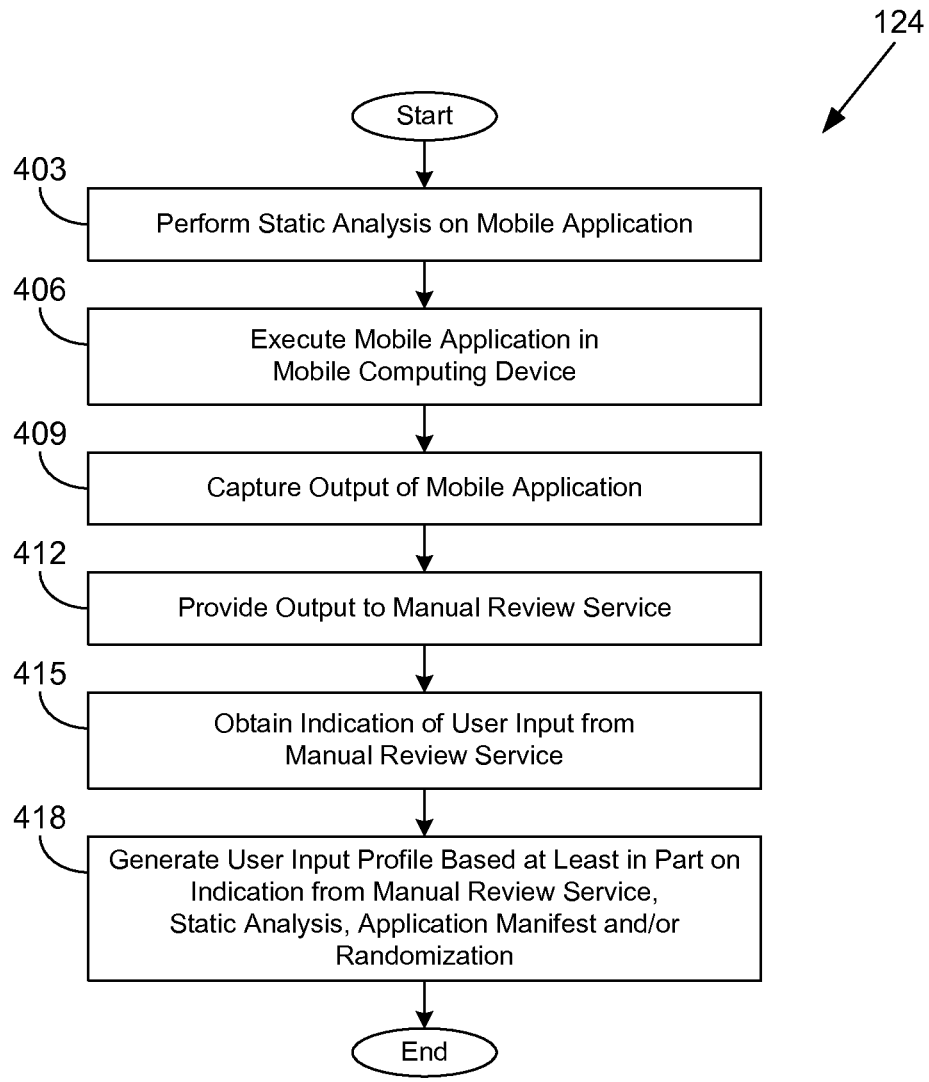

Moving on to FIG. 4, shown is a flowchart that provides one example of the operation of another portion of the mobile application verification service 124 according to various embodiments. In particular, the flowchart of FIG. 4 relates to the generation of the user input profile 136 (FIG. 1). It is understood that the flowchart of FIG. 4 provides merely an example of the many different types of functional arrangements that may be employed to implement the operation of the portion of the mobile application verification service 124 as described herein. As an alternative, the flowchart of FIG. 4 may be viewed as depicting an example of steps of a method implemented in the computing environment 103 (FIG. 1) according to one or more embodiments.

Beginning with box 403, the mobile application verification service 124 performs a static analysis on the mobile application 130 (FIG. 1) to generate the static analysis data 145 (FIG. 1). In box 406, the mobile application verification service 124 executes the mobile application 130 in one or more mobile computing devices 115 (FIG. 1) and/or emulated mobile computing devices 206 (FIG. 2). In box 409, the mobile application verification service 124 captures the output of the mobile application 130, which may be stored as the captured application output 151 (FIG. 1).

In box 412, the mobile application verification service 124 provides at least a portion of the captured application output 151 to the manual review service 127 (FIG. 1) for manual review. In box 415, the mobile application verification service 124 obtains an indication of the user input (e.g., type, content, actual sample input, etc.) from the manual review service 127. The user input indicated by the manual review service 127 corresponds to that which is to be provided to the mobile application 130 at the particular time or activity associated with the captured application output 151. The results of the manual review may be stored as manual review data 148 (FIG. 1).

In box 418, the mobile application verification service 124 generates the user input profile 136 based at least in part on the user input indication from the manual review service 127, the static analysis data 145, a manifest associated with the mobile application 130, and/or randomization. In one embodiment, the resulting simulated user input is entirely automatically generated. In another embodiment, the resulting simulated user input may be based at least in part on manual configuration supplied by the manual review service. Thereafter, the portion of the mobile application verification service 124 ends.

Figure 5:
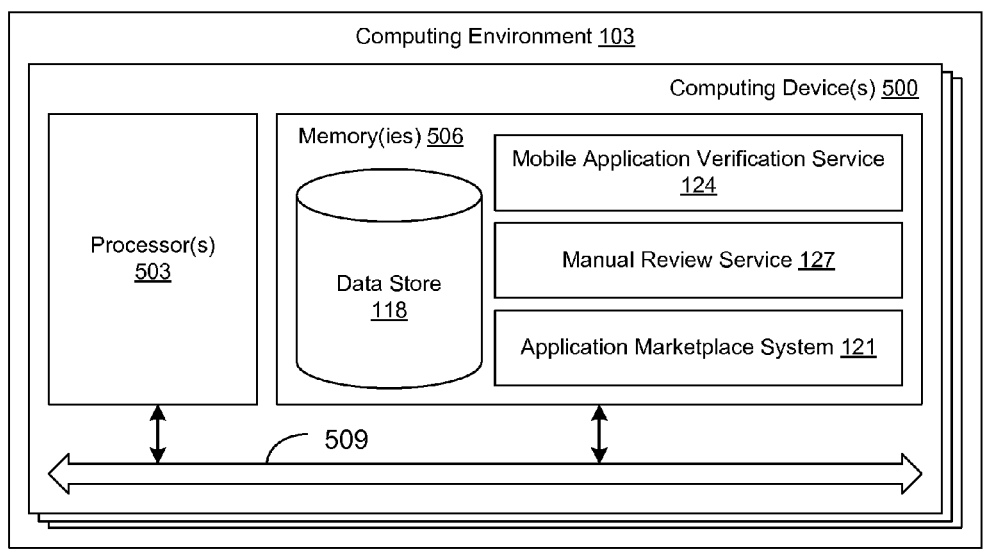
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the application marketplace system 121, the mobile application verification service 124, the manual review service 127, and potentially other applications. Also stored in the memory 506 may be a data store 118 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the application marketplace system 121, the mobile application verification service 124, the manual review service 127, the testing management layer 166 (FIG. 1) and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the mobile application verification service 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application marketplace system 121, the mobile application verification service 124, the manual review service 127, and the testing management layer 166, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   a mobile application verification service executable in the at least one computing device, the mobile application verification service comprising:
   logic, stored in a memory, that obtains a mobile application from a source entity of the mobile application;
   logic that automatically installs the mobile application in a plurality of different mobile computing devices in a testing environment;
   logic that automatically initiates execution of the mobile application in the different mobile computing devices;
   logic that generates a user input profile for the mobile application by performing a static analysis on the mobile application;
   logic that automatically generates simulated user input for the mobile application, wherein the logic that executes is configured to provide the simulated user input to the mobile application, and wherein the simulated user input is generated based at least in part on the user input profile; and
   logic that automatically verifies whether the mobile application meets at least one performance criterion in individual ones of the different mobile computing devices.

2. The system of claim 1, wherein the logic that automatically initiates execution is further configured to execute the mobile application in an emulated version of at least one of the different mobile computing devices.

3. The system of claim 1, wherein the at least one performance criterion includes a progress criterion based at least in part on a progress among a plurality of activities in the mobile application.

4. The system of claim 1, wherein the at least one performance criterion includes a stability criterion based at least in part on whether the mobile application becomes unresponsive.

5. The system of claim 1, wherein the at least one performance criterion includes a security criterion based at least in part on whether the mobile application accesses a protected resource.

6. The system of claim 1, wherein the mobile application verification service is operated by a proprietor of an application marketplace, and the mobile application verification service further comprises logic that permits the mobile application to be offered in the application marketplace based at least in part on whether the mobile application meets the at least one performance criterion in at least one of the different mobile computing devices.

7. The system of claim 1, wherein the mobile application verification service is operated by a proprietor of an application marketplace, and the mobile application verification service further comprises logic that excludes the mobile application from the application marketplace based at least in part on whether the mobile application meets the at least one performance criterion in at least one of the different mobile computing devices.

8. The system of claim 1, wherein the mobile application verification service further comprises logic that reports whether the mobile application meets the at least one performance criterion in the individual ones of the different mobile computing devices to the source entity.

9. The system of claim 1, wherein the logic that generates the simulated user input for the mobile application is based at least in part on a manual review of a screen capture from at least one of the different mobile computing devices.

10. The system of claim 1, wherein the logic that generates the simulated user input for the mobile application is based at least in part on an automated analysis of a screen capture from at least one of the different mobile computing devices.

11. The system of claim 1, wherein the at least one performance criterion is based at least in part on a resource consumption metric.

12. The system of claim 1, wherein the mobile application verification service is operated by a proprietor of an application marketplace.

13. A method, comprising:
automatically initiating, by at least one computing device, a corresponding instance of a mobile application in individual ones of a plurality of different mobile computing devices in a testing environment;
generating, in the at least one computing device, a user input profile for the mobile application by performing a static analysis on the mobile application;
automatically generating, in the at least one computing device, simulated user input at least in part by way of a randomized process and based at least in part on the user input profile;
automatically providing, in the at least one computing device, the simulated user input to individual ones of the corresponding instances of the mobile application;
evaluating, in the at least one computing device, at least one performance characteristic for the individual ones of the corresponding instances of the mobile application in response to the simulated user input.

14. The method of claim 13, wherein at least some of the different mobile computing devices correspond to emulated mobile computing devices.

15. The method of claim 13, wherein at least some of the different mobile computing devices correspond to physical mobile computing devices.

16. The method of claim 13, wherein the at least one performance characteristic includes whether the corresponding instance of the mobile application has become unresponsive.

17. The method of claim 13, wherein the at least one performance characteristic includes whether the corresponding instance of the mobile application has crashed.

18. The method of claim 13, wherein the at least one performance characteristic is based at least in part on a resource consumption metric.

19. The method of claim 13, further comprising obtaining, in the at least one computing device, the mobile application from a source entity of the mobile application.

20. The method of claim 13, further comprising automatically transferring, in the at least one computing device, the mobile application to the individual ones of the different mobile computing devices.

21. The method of claim 13, further comprising automatically configuring, in the at least one computing device, the individual ones of the different mobile computing devices to obtain the mobile application.

22. The method of claim 13, further comprising automatically initializing, in the at least one computing device, a system state of the individual ones of the different mobile computing devices.

23. The method of claim 13, wherein the simulated user input includes at least one of a simulated touch screen gesture, an audio input, or an image input.

24. The method of claim 13, wherein the evaluating is performed based at least in part on an absolute evaluation criterion applied across the plurality of different mobile computing devices in the testing environment.

25. A non-transitory computer-readable medium embodying at least one program executable in a computing device, comprising:
code that obtains a mobile application from a source entity of the mobile application;
code that automatically installs the mobile application in a plurality of different mobile computing devices and a plurality of different emulated mobile computing devices in a testing environment;
code that automatically initiates execution of a corresponding instance of the mobile application in individual ones of the different mobile computing devices and individual ones of the different emulated mobile computing devices;
code that generates a user input profile for the mobile application by performing a static analysis on the mobile application;
code that automatically generates and provides simulated user input to individual ones of the corresponding instances of the mobile application, the simulated user input generated based at least in part on the user input profile;
code that evaluates at least one performance characteristic for the individual ones of the corresponding instances of the mobile application in response to the simulated user input; and code that determines whether the mobile application may be offered in an application marketplace based at least in part on the at least one performance characteristic.

26. The non-transitory computer-readable medium of claim 25, further comprising code that determines whether the mobile application is compatible with one of the different mobile computing devices based at least in part on the at least one performance characteristic associated with the one of the different mobile computing devices.

\* \* \* \* \*